United States Patent
Amour et al.

(10) Patent No.: US 8,130,765 B2
(45) Date of Patent: Mar. 6, 2012

(54) METHOD FOR PROCESSING DATA PACKETS WHILE COMMUNICATING WITH A MACHINE VIA ONE OR MORE SECONDARY NETWORKS

(75) Inventors: Francoise Amour, Paris (FR); Lars Kiessling, Chatillon (FR); Jocelyn Barranco, Issy les Moulineaux (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 12/126,450

(22) Filed: May 23, 2008

(65) Prior Publication Data

US 2008/0298377 A1    Dec. 4, 2008

(30) Foreign Application Priority Data

May 29, 2007   (FR) ..................... 07 55316

(51) Int. Cl.
*H04L 12/28* (2006.01)
(52) U.S. Cl. ...................................................... 370/400
(58) Field of Classification Search .................. 370/203, 370/254–258, 351–359, 386–400, 395.1, 370/395.2, 395.3, 395.5, 412–418
See application file for complete search history.

(56) References Cited

U.S. PATENT DOCUMENTS

| 5,166,931 | A  | * | 11/1992 | Riddle | 370/401 |
| 5,790,541 | A  | * | 8/1998 | Patrick et al. | 370/392 |
| 6,332,023 | B1 | * | 12/2001 | Porter et al. | 379/242 |
| 6,678,283 | B1 | * | 1/2004 | Teplitsky | 370/463 |
| 6,741,585 | B1 | * | 5/2004 | Munoz et al. | 370/352 |
| 7,215,667 | B1 | * | 5/2007 | Davis | 370/389 |
| 2005/0169270 | A1 | * | 8/2005 | Mutou et al. | 370/390 |
| 2009/0248873 | A1 | * | 10/2009 | Johnsson | 709/226 |

FOREIGN PATENT DOCUMENTS

WO  WO 2006/108168 A2  10/2006
WO  WO 2006/125044 A1  11/2006

* cited by examiner

*Primary Examiner* — Kwang B Yao
*Assistant Examiner* — Jung-Jen Liu
(74) *Attorney, Agent, or Firm* — Oblon, Spivak, McClelland, Maier & Neustadt, L.L.P.

(57) ABSTRACT

An apparatus and associated methodology for processing at least one data packet received by a receiving entity from a machine after transmission via at least one data transmission network. Identification data is obtained of a device involved in the transmission of said data packet. A decoding function associated with said device is identified using the identification data. The decoding function is an inverse function of an encoding function applied by the device to a packet before transmission. The received packet is decoded through the application of the decoding function.

8 Claims, 4 Drawing Sheets

METHOD FOR PROCESSING DATA PACKETS WHILE COMMUNICATING WITH A MACHINE VIA ONE OR MORE SECONDARY NETWORKS

The inventions described relate to the field of telecommunications and, more specifically, to a method for processing data packet received from or to be transmitted to a machine via a telecommunications network.

BACKGROUND

In the machine-to-machine communications field, referred to as M2M for short, machines are often accessible from a main network via a communications gateway between this main network and a secondary network or capillary network. Depending on the complexity of the network, it is sometimes necessary to cross a plurality of secondary networks in order to communicate with the machine.

A machine belonging to a secondary network is addressable and identifiable in a unique manner from a device which manages this secondary network. However, a machine of this type is not necessarily addressable from a different network or a different secondary network, either because the addressing technology of one machine varies from one secondary network to another, or because the identifier used to identify the machine in its secondary connection network is used for a different machine in a different secondary network.

In view of the prior art, inventors have thus noted a need for a generic mechanism for communicating with machines which can be applied regardless of the number of levels of sub-networks present and regardless of the addressing technologies used in these different sub-networks.

One of the objects of the invention is to correct these deficiencies and disadvantages of the prior art and/or make improvements to them.

SUMMARY

In accordance with the invention there is provided a method for processing at least one data packet received by a receiving entity from a machine after transmission via at least one data transmission network, said method comprising:
  obtaining identification data of a device involved in the transmission of said data packet,
  identification of a decoding function associated with said identification data, said decoding function being an inverse function of an encoding function applied by said device to a packet before transmission,
  decoding the received packet through the application of said decoding function.

In accordance with the invention there is further provided a method for processing at least one data packet to be transmitted by a transmitting entity to a machine via a data transmission network, said method comprising:
  obtaining identification data of a device to be involved in the transmission of said data packet,
  identification of an encoding function associated with said identification data, said encoding function being an inverse function of a decoding function applied by said device to a packet before transmission,
  encoding of said packet through the application of said encoding function,
  dispatching to said device by said transmitting entity of the packet obtained as a result of the encoding step, for the purpose of transmitting said packet to said machine.

The invention is based on the implementation in a receiving/transmitting entity, in the form, for example, of a communications platform, of means for the identification of encoding or decoding functions, in association with the different devices for interconnection between networks via which the packets pass which are transmitted by or are destined for a machine connected to one of these networks, said encoding and decoding functions corresponding respectively to decoding and encoding functions implemented respectively in the different devices during the transmission of a packet.

The invention enables the different processing operations carried out by one or more interconnection devices during the passage of packets to be taken into account in a centralized manner. This means, in particular, that communication with the machines which are connected to the different secondary networks accessible via these interconnection devices does not require modification of either the interconnection devices or the terminal machines. Said processing operations are taken into account in a centralized manner in the communications platform which forms the receiving/transmitting entity, the latter being equipped with functions corresponding to those implemented in the interconnection device(s) involved in the transmission of the packet.

According to a particular embodiment, the decoding step is applied iteratively to the current packet which comprises the packet obtained as a result of the preceding decoding step, through the application on each iteration of the decoding function associated with identification data of each device of a succession of devices which are involved in the transmission of said packet from said machine to the receiving entity, wherein the order of the devices respectively associated with the decoding functions applied during the successive decoding steps is the reverse order of the order in which the devices are involved during the transmission of said packet from said machine to the receiving entity.

When it receives a packet, the communications platform is thus able to restore the raw message originating from a machine, regardless of the number of interconnection devices via which this packet passes and regardless of the address encoding/decoding operations or other operations applied to this packet by these interconnection devices during the passage of the packet.

Reciprocally, the encoding step is applied iteratively to the current packet which comprises the packet obtained as a result of the preceding encoding step, through the application on each iteration of the encoding function associated with identification data of each device of a succession of devices which are intended to be involved in the transmission of said packet from the transmitting entity to said machine, wherein the order of the devices respectively associated with the encoding functions applied during the successive encoding steps is the inverse order of the order in which the devices are involved during the transmission of said packet from the transmitting entity to said machine.

Thus, when it wishes to send a packet to a given machine, the communications platform is able to generate a packet which is coded in an appropriate manner. In fact, regardless of the number of devices via which this packet is to pass and regardless of the address encoding/decoding operations or other applications applied to this packet by these devices during the passage of the packet, the packet reaches the destination machine, coded in an appropriate manner, which can be understood by the destination machine without the need to modify this machine.

In accordance with the invention there is also provided a communications device suitable for receiving at least one data packet originating from a machine after transmission via at least one data transmission network, said device comprising:

means for obtaining identification data of a device involved in the transmission of said data packet,     means for identifying a decoding function associated with said identification data, said decoding function being an inverse function of an encoding function applied by said device to a packet before transmission,     means for decoding the received packet through application of said decoding function.

In accordance with the invention there is also provided a communications device suitable for transmitting at least one data packet to a machine via a data transmission network, said device comprising:

obtaining identification data of a device to be involved in the transmission of said data packet,     means for identifying an encoding function associated with said identification data, said encoding function being an inverse function of a decoding function applied by said device to a packet before transmission,     means for encoding said packet through the application of said encoding function,     dispatching means for dispatching the packet obtained in the encoding step to said device, for the purpose of transmitting said packet to said machine.

BRIEF DESCRIPTION OF THE DRAWINGS

Other objects, characteristics and advantages of the invention will become evident from the following description, given purely by way of a non-limiting example, and drawn up with reference to the attached drawings, in which.

DETAILED DESCRIPTION

The invention is based on the implementation, in a communications platform, of means for performing encoding and decoding functions of the type implemented in the different interconnection devices between networks via which the packets transmitted from or destined for a machine connected to one of these networks pass. It can be applied, regardless of whether these machines are directly accessible by the platform or via a gateway, and independently of the addressing technology used in the secondary network.

The order in which these functions are carried out in the platform reflects the path followed by the packet during its transmission via the data transmission network which comprises all of the different interconnected networks.

Moreover, the information relating to the paths taken by the packets can be inferred directly from the packets received by the platform and can therefore be reconstituted by this platform on the basis of the received packets.

FIGS. 1 to 4 schematically show different network configurations to which the method according to the invention can be applied. In these different figures, the same references are used for identical elements:

M0, M1, M2, M3, M4, M5 denote machines: these may involve any type of communicating machine or equipment suitable for being connected to a data transmission network, for example, a sensor, an actuator, an automatic distributor, an electric meter, etc.;

PF denotes a communications platform designed to communicate with any of the machines M0 to M5 and any one of the interconnection platforms GW1 and GW2;

GW1 and GW2 denote interconnection platforms or gateways between two networks.

These two platforms GW1 and GW2 are themselves considered as machines within the context of the invention. In fact, a platform of this type is capable of transmitting and/or receiving packets on its own account, and can therefore be seen by the platform PF as a machine receiving and/or emitting data paquets.

Figure 1:
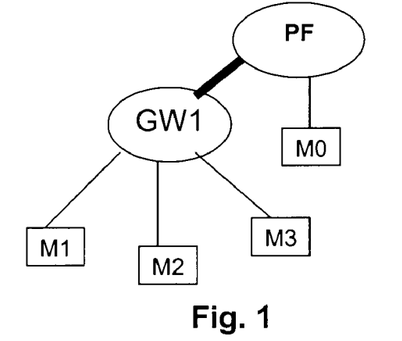
FIGS. 1 to 4 schematically show different network configurations to which the method according to the invention is applied.

In the case of the configuration shown in FIG. 1, the platform PF is connected to a gateway GW1, managing a secondary network to which the machines M1 to M3 are connected. A machine M0 is directly connected to the platform PF.

Figure 2:
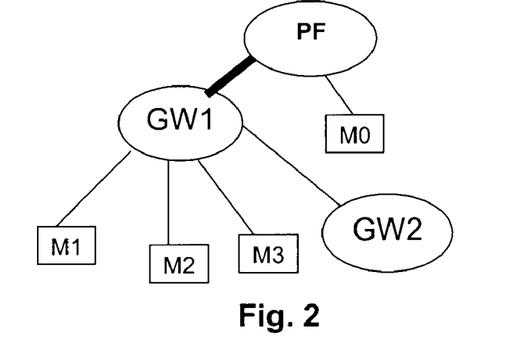

The configuration shown in FIG. 2 is identical to the configuration shown in FIG. 1, except that a second gateway GW2 is furthermore connected to the first gateway GW1.

Figure 3:
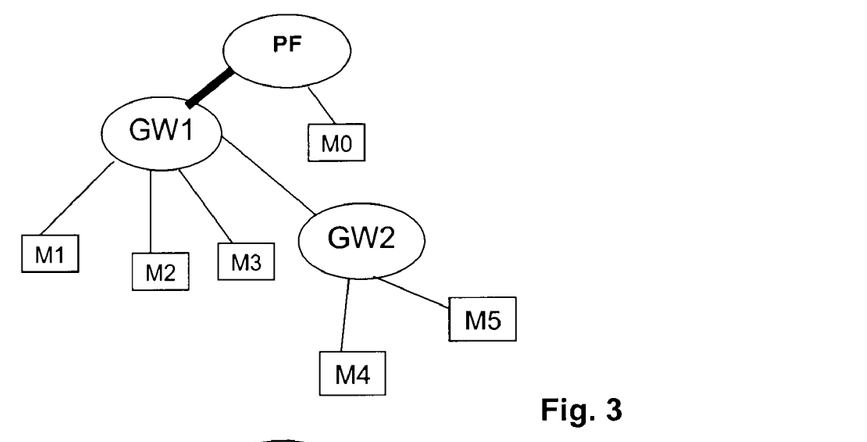

The configuration shown in FIG. 3 is identical to the configuration shown in FIG. 2, except that two machines M4 and M5 are furthermore connected to the gateway GW2.

Figure 4:
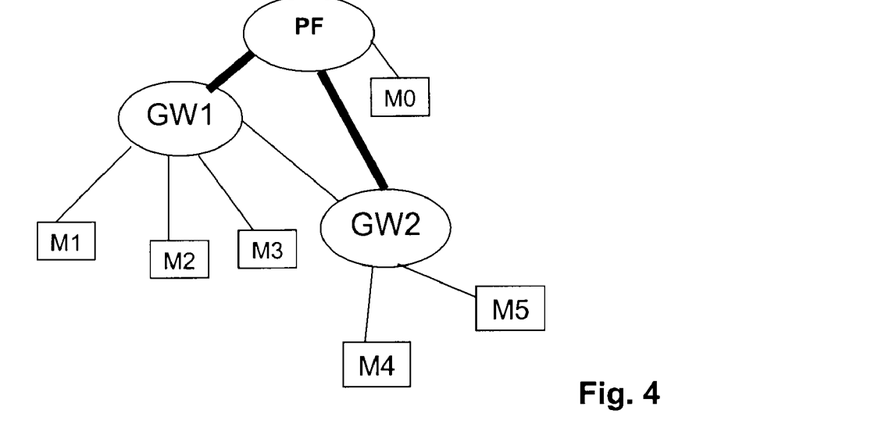

The configuration shown in FIG. 4 is identical to the configuration shown in FIG. 3, except that the gateway GW2 is connected to both the gateway GW1 and the platform PF.

In these different configurations, the network managed by the platform PF corresponds to the group comprising the gateway GW1 and the machine MO. The network managed by the gateway GW1 corresponds to the group comprising the machines M1 to M3 and the gateway GW2. The network managed by the gateway GW2 corresponds to the group comprising the machines M4 and M5.

Figure 5:
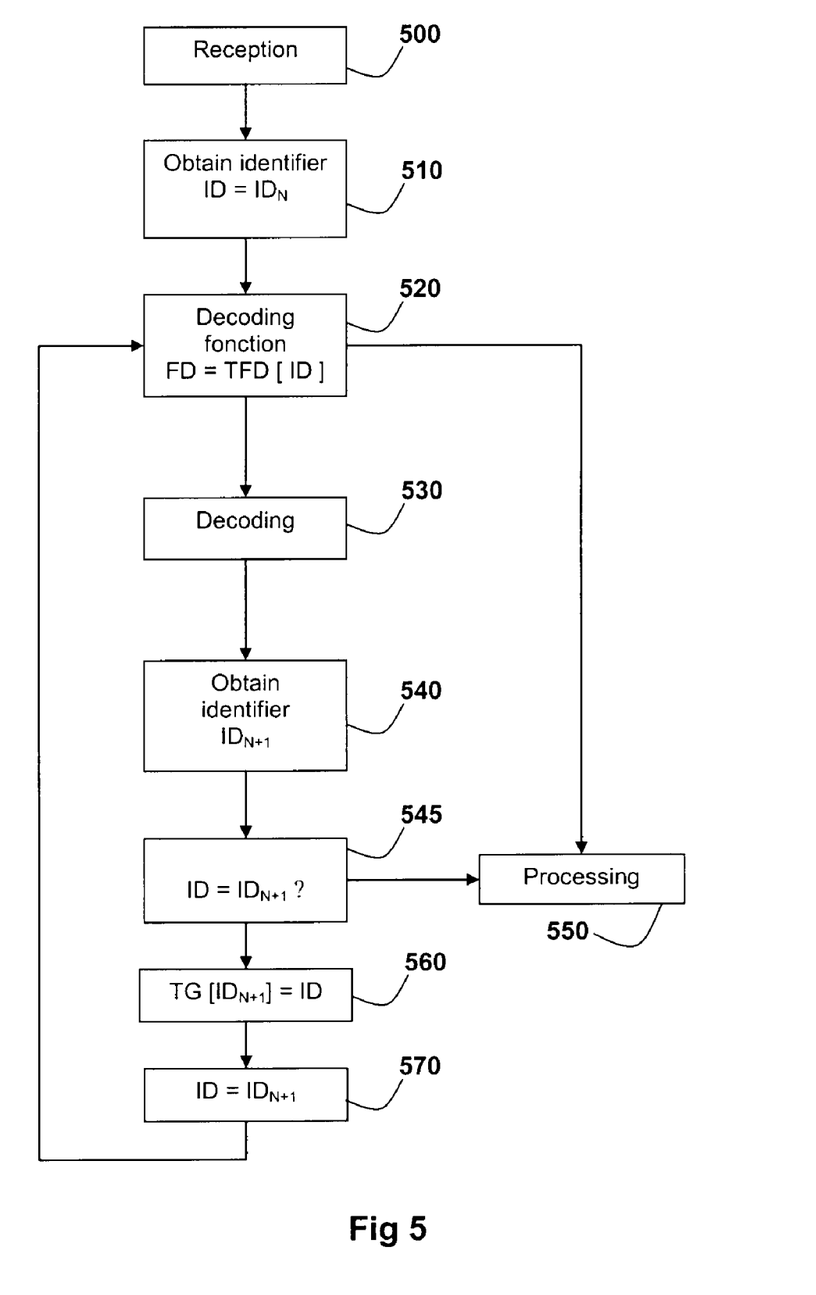
FIG. 5 is a flow diagram of a method according to the invention, relating to the reception of data packets originating from a machine.
Figure 7A:
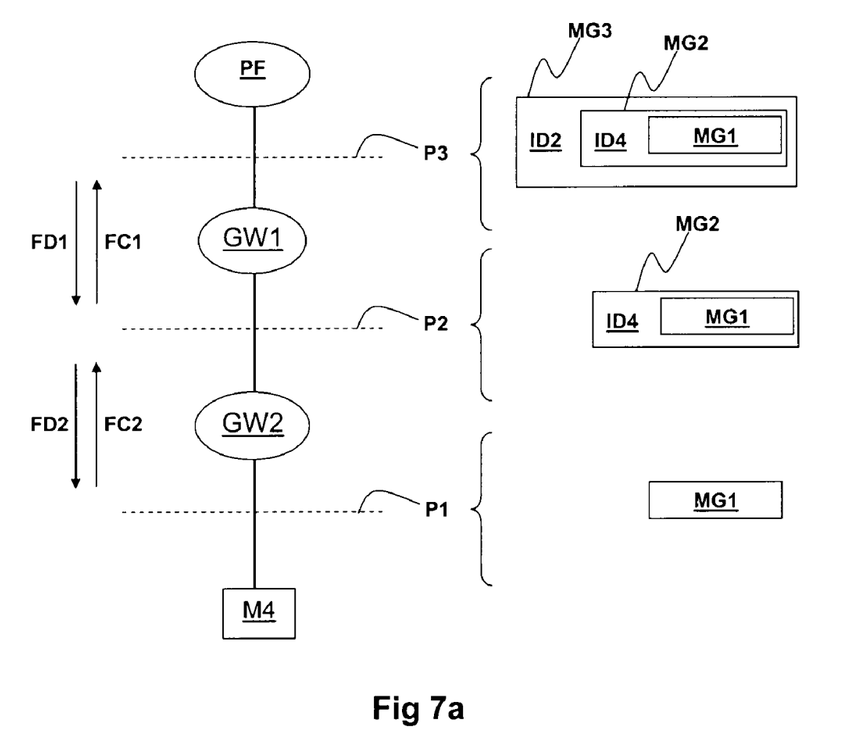
FIG. 7a schematically shows different states of a first example of a data packet during its transmission between a machine and a platform.

The method according to the invention, as far as the packet reception part is concerned, is described in greater detail in FIG. 5, in the case of the network configuration shown in FIG. 4 and using the example of data packets shown in FIG. 7a.

In this example, a data packet P is transmitted by the machine M4 to the platform PF. As shown in FIG. 7a, the packet passes successively via the gateway GW2 then via the gateway GW1. The data packet P has different contents P1, P2, P3 during its transmission from the machine M4 to the platform PF.

Following transmission by the machine M4 and on reception by the gateway GW2, the packet P has a content P1. To simplify the explanation, the packet P with content P1 is also referred to for short as "packet P1". The packet Pi comprises, in particular, a message MG1 which is intended to be transmitted to the platform PF.

The packet P1 optionally contains an identification of the destination platform PF. Depending on the data transmission protocol used between the machine M4 and the gateway GW2, the identification may be transmitted, not with or in the packet P1, but during a dialogue according to this protocol between the machine M4 and the gateway GW2, for example during the connection of the machine M4 to the gateway.

The packet P1 optionally comprises identification data of the machine M4. Depending on the addressing technology used by the gateway GW2 and depending on the data transmission protocol used between the machine M4 and the gateway GW2, these identification data are transmitted, not with or in the packet P1, but during a dialogue between the machine M4 and the gateway GW2.

Following transmission by the gateway GW2 and on reception by the gateway GW1, the packet P has a content P2. To simplify the explanation, the packet P with content P2 is also referred to for short as "packet P2". The packet P2 comprises the message MG1 which is intended to be transmitted to the platform PF. Optionally, depending on the data transmission protocol used, the packet P2 comprises an identification of the destination platform and/or identification data of the gateway GW2 which transmitted the packet P2.

The packet P2 is generated from the packet P1 as received by the gateway GW2 by applying an encoding function FC2 associated with the gateway GW2. The encoding function associated with the gateway GW2 is applied by the gateway GW2 to any packet originating from the secondary network (to which the machines M4 and M5 belong) managed by this gateway. The encoding function FC2 consists in particular in encapsulating the message MG1 of the packet P1 in a message MG2 and inserting identification data ID4 of the machine M4 transmitting the packet P1 into the message MG2. The encoding function FC2 may moreover consist in modifying the format of all or part of the data of the packet P1 or in applying any other processing to all or part of the data of the packet P1.

Following transmission by the gateway GW1 and on reception by the platform PF, the packet P has a content P3. To simplify the explanation, the packet P with content P3 is also referred to for short as "packet P3". The packet P3 comprises the message MG1 which is intended to be transmitted to the platform PF. optionally, depending on the data transmission protocol used, the packet P3 furthermore comprises an identification of the destination platform and/or identification data ID1 of the gateway GW1 which transmits the packet P3.

The packet P3 is generated from the packet P2 as received by the gateway GW1 by applying an encoding function FC1 associated with the gateway GW1. The encoding function FC1 associated with the gateway GW1 is applied by the gateway GW1 to any packet originating from the secondary network (to which the machines M1, M2, M3 and the gateway GW2 belong) managed by this gateway. The encoding function FC1 consists in particular in encapsulating the message MG2 of the packet P2 in a message MG3 and inserting identification data ID2 of the machine GW2 transmitting the packet P2 into the message MG3. The encoding function FC1 may moreover consist in modifying the format of all or part of the data of the packet P2 or in applying any other processing to all or part of the data of the packet P2.

When the packet P is transmitted by the platform PF to the machine M4, the packet P, while passing via the gateway GW1, then GW2, undergoes transformations which are the inverse of those described in the case of its transmission from the machine M4 to the platform PF. In particular, the packet P successively takes the contents P3, then P2, then P1, with the only difference that the content of the message MG1 destined for the machine M4 is in this case generated by the platform PF.

Thus, on reception of the packet P3 originating from the platform PF, the gateway GW1 applies a decoding function FD1 associated with the gateway GW1, a function which is the inverse of the encoding function FC1 described above. In other words, the application of the decoding function FD1 to the packet P with content P3 enables a packet P with content P2 to be obtained.

Similarly, on reception of the packet P2 originating from the gateway GW1, the gateway GW2 applies a decoding function FD2 associated with the gateway GW2, a function which is the inverse of the encoding function FC2 described above. In other words, the application of the decoding function FD2 to the packet P with content P2 enables a packet P with content P1 to be obtained.

On reception by the platform PF of the packet P with content P3, transmitted by the machine M4, the method shown in FIG. 5, comprising the steps 500 to 570, is carried out by the platform PF.

In the step 500, the platform PF receives the packet P with content P3.

In the step 510, the platform PF obtains identification data ID1 from the transmitter of the received packet, in this case identification data of the gateway GW1. The platform PF records the identification data ID1 in a memory ID:

$$ID=ID1$$

In the step 520, the platform PF searches for an identifier of a decoding function FD associated with the identification data stored in the memory ID:

$$FD=TFD\ [ID]$$

This identifier was previously stored in a memory, in a first table TFD referred to as the decoding functions table, in association with the identification data ID stored in the step 510, in this case the identification data ID1 of the gateway GW1. An identifier of this type is implemented, for example, in the form of a pointer to a decoding software function, a pointer by means of which the function can easily be activated.

If no decoding function identifier is located or if this identifier is a zero pointer, this means that no decoding function is to be carried out by the platform PF. This occurs particularly in the case where the machine is directly connected to the platform PF, as in the case, for example, of the machine MO shown in FIG. 4. In this case, the step 550 is carried out following the step 520. In the opposite case, the step 530 is carried out following the step 520. In the example described, the step 530 is carried out following the step 520.

In the step 530, if an executable function has been identified, the platform PF carries out this function and applies it to the received packet. In the case of the example provided in FIG. 7a, the packet P received by the platform PF, with content P3, is decoded by means of the identified decoding function FD, a function which, in this case, is the decoding function FD1 associated with the gateway GW1, in such a way as to restore the content P2 of the packet P as transmitted by the gateway GW2.

In the step 540, the identification data $ID_{N+1}$ which were encapsulated in the packet P3, are extracted following the decoding step 530. In the example described, these data correspond to the identification data ID2 of the machine GW2 transmitting the packet P2:

$$ID_{N+1}=ID2.$$

In the step 545, the identification data $ID_{N+1}$ extracted in the step 540 are compared with the identification data of the transmitter of the packet stored in the memory ID. If the values are equal, the method is continued by the step 550. This takes place particularly in the case where the gateway GW1 sends to the platform PF data of which it is the transmitter (i.e. the gateway GW1 sends data for its own account). In the opposite case, the step 560 is carried out following the step 545. In the chosen example, given that ID=ID1 (identification data of gateway GW1) and that $ID_{N+1}=ID2$ (identification data of gateway GW2) the step 560 is carried out following the step 545.

In the step 560, the platform PF stores, in a second table TG, referred to as the management table, in association with the identification data $ID_{N+1}=ID2$ obtained in the step 540, the identification data ID1 stored in the memory ID:

$TG\ [ID_{N+1}]=ID$ i.e.:

$TG[ID2]=ID1.$

The management table is used to store the fact that a machine forms part of a secondary network, managed by and accessible via a different gateway machine. In the chosen example, the gateway GW2 forms part of a secondary network accessible via the gateway GW1.

More generally, the management table is used for recording, in association with identification data of a first machine, identification data of a second machine via which the secondary network to which the first machine belongs is accessible.

In the step 570, the platform PF records in a memory ID the identification data ID2 obtained in the step 540:

$ID=ID2.$

Following the updating of the memory ID carried out in the step 570, the method proceeds to the step 520. The steps 520 to 545 are iterated once more with the packet P2 instead of P3, and with the identification data ID2 instead of ID1.

In the chosen example, the performance of this second iteration is carried out as follows.

In the step 520, the platform PF searches for an identifier of a decoding function FD associated with the identification data stored in the memory ID:

$FD=TFD\ [ID\ ].$

In the step 530, the platform PF carries out this function and applies it to the received packet P2. In the case of the chosen example, the packet P2 is decoded by means of the identified decoding function FD, a function which, in this case, is the decoding function FD2 associated with the gateway GW2 since ID=ID2. The packet P1 is thus restored.

In the step 540, the identification data $ID_{N+1}$, which were encapsulated in the packet P2, are extracted following the decoding step 530. In the example described, these data correspond to the identification data ID4 of the machine M4 transmitting the packet P1.

In the step 545, the identification data $ID_{N+1}$ extracted in the step 540 are compared with the identification data stored in the memory ID. In the example described, the identification data ID=ID2 of the machine GW2 are compared with the identification data $ID_{N+1}=ID4$ of the machine M4. In the chosen example, these are not equal, and so the step 560 is carried out following the step 545.

In the step 560, the platform PF stores, in a second table TG referred to as the management table, in association with the identification data $ID_{N+1}=ID4$ obtained in the step 540, the identification data ID2 stored in the memory ID:

$TG\ [ID_{N+1}]=ID$ i.e.:

$TG\ [ID4]=ID2.$

The management table thus informed enables the platform PF to store the fact that the machine ID4 forms part of a secondary network accessible via the gateway GW2.

In the step 570, the platform PF records in a memory ID the identification data ID4 obtained in the preceding step 540:

$ID=ID4.$

Following the updating of the memory ID carried out in the step 570, the method proceeds to the step 520 with the packet P1 instead of P2, and with the identification data ID=ID4 instead of ID2.

In the chosen example, the performance of this third iteration is carried out as follows.

In the step 520, the platform PF searches for an identifier of a decoding function FD associated with the identification data stored in the memory ID:

$FD=TFD\ [ID].$

In the case of the chosen example, the identifier is zero, no function FD being associated with the machine M4. The step 550 is therefore then carried out.

In the step 550, the message MG1, contained in the packet P1 obtained in the step 520, is extracted then processed by the platform PF according to the content of this message.

Figure 6:
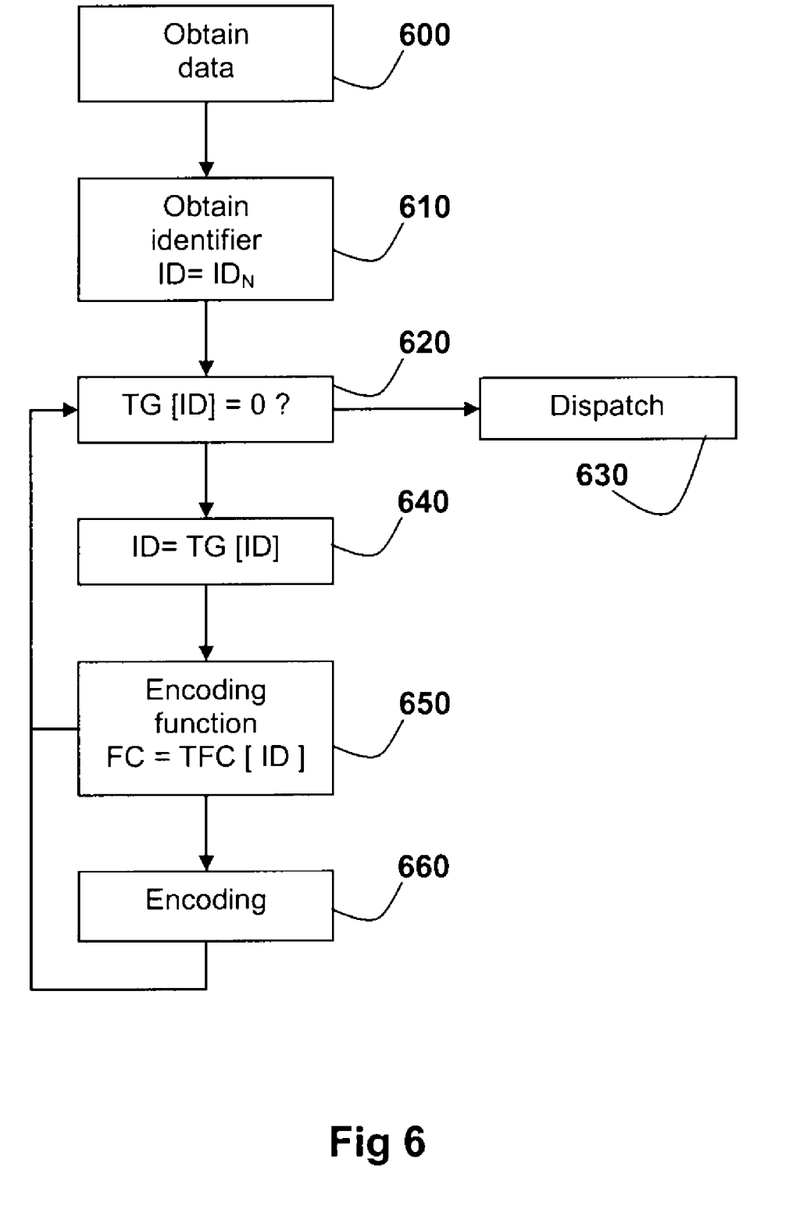
FIG. 6 is a flow diagram of a method according to the invention, relating to the part entailing the transmission of data packets destined for a machine.

The method according to the invention, as far as the packet transmission part is concerned, is described in more detail in FIG. 6, in the case of the network configuration shown in FIG. 4 and using the example of data packets shown in FIG. 7a.

In this example, a data packet P is intended to be transmitted by the platform PF to the machine M4. As shown in FIG. 7a, the packet, following dispatch, passes successively via the gateway GW1, then via the gateway GW2. The data packet P has different contents P3, P2, P1 during its transmission from the platform PF to the machine M4.

Before dispatch by the platform PF of the packet P with content P3, the method shown in FIG. 6, comprising the steps 600 to 660, is carried out by the platform PF.

In the step 600, the platform PF generates the content of the message MG1 to be dispatched.

In the step 610, the platform PF obtains identification data ID4 from the machine to which the message MG1 is to be dispatched. The identification data ID4 are stored in the memory ID:

$ID=ID4.$

In the step 620, the platform PF interrogates the management table TG to identify a gateway via which the packet must pass in order to reach the packet destination machine. If the value TG[ID] stored in the table in association with the identification data stored in ID is zero or if no value is stored, the method proceeds to the step 630, otherwise with this step 640. As the value TG[ID] stored in the table TG for ID=ID4 corresponds to the identification data ID2, the gateway GW2 is identified as the access gateway to the secondary network to which the machine M4 belongs. In the example described, the step 640 is therefore carried out.

In the step 640, the platform PF stores in ID the identifier of the gateway via which the packet must pass in order to reach the packet destination machine:

$ID=TG\ [ID]$

In the chosen example, the new identifier stored in ID is equal to $ID=TG\ [ID4]=ID2.$ In the step 650, the platform PF searches, in a third table TFC, referred to as the encoding functions table, for an identifier FC of an encoding function associated with the identifier stored in the memory ID:

$FC=TFC\ [ID\ ].$

This identifier was previously stored in the memory, in association with the identification data ID, in this case the identification data ID2 of the gateway GW2. An identifier of this type is implemented, for example, in the form of a pointer to a encoding software function, a pointer by means of which the function can easily be activated.

If no encoding function identifier is located or if this identifier is a zero pointer, this means that no encoding function is to be carried out by the platform PF. This occurs in the case where the packet destination machine is the final destination of the data. In this case, the step 620 is carried out following the step 650. In the opposite case, the step 660 is carried out following the step 650. In the case of the example described, the step 660 is carried out, the encoding function FC=FC2 being obtained by consulting the table TFC on the basis of the identification data ID2 of the GW2.

In the step 660, if an executable encoding function FC has been identified in the step 650, the platform PF carries out the encoding function FC2 and applies it to the packet P1 to be transmitted, in such a way as to obtain the packet P2. The step 620 is carried out following the step 660.

In the step 620, the platform PF interrogates the management table TG to identify a gateway via which the packet P2 must pass in order to reach the packet destination machine. As the value TG[ID] stored in the table TG for ID=ID2 corresponds to the identification data ID1, the gateway GW1 is identified as the access gateway to the secondary network to which the gateway GW2 belongs.

In the step 640, the platform PF stores in ID the identifier of the gateway via which the packet must pass in order to reach the packet destination machine:

*ID=TG [ID ].*

In the chosen example, the new identifier stored in ID is equal to

*ID=TG [ID2]=ID*1.

In the step 650, the platform PF searches, in the encoding functions table TFC, for an identifier FC of an encoding function associated with the identifier stored in the memory ID:

*FC=TFC [ID ].*

In the case of the example described, the encoding function FC=FC1 is obtained by consulting the table TFC on the basis of the identification data ID=ID1 of the gateway GW1. The step 660 is then carried out, with the platform PF carrying out the encoding function FC1 obtained in the step 650 and applying it to the packet P2 to be transmitted, in such a way as to obtain a packet P3. The step 620 is carried out following the step 660.

In the step 620, the platform PF once more interrogates the management table TG to identify a gateway via which the packet P3 must pass in order to reach the packet destination machine. As the value TG[ID] stored in the table TG for ID=ID1 is zero, the platform PF is identified as the access device to the network to which the gateway GW1 belongs. As the value obtained in the step 620 is zero, the step 630 is then carried out.

In the final step 630, the packet encoded by the platform is dispatched, an operation to format the data of this packet being applied if necessary to the packet before dispatch.

Figure 7B:
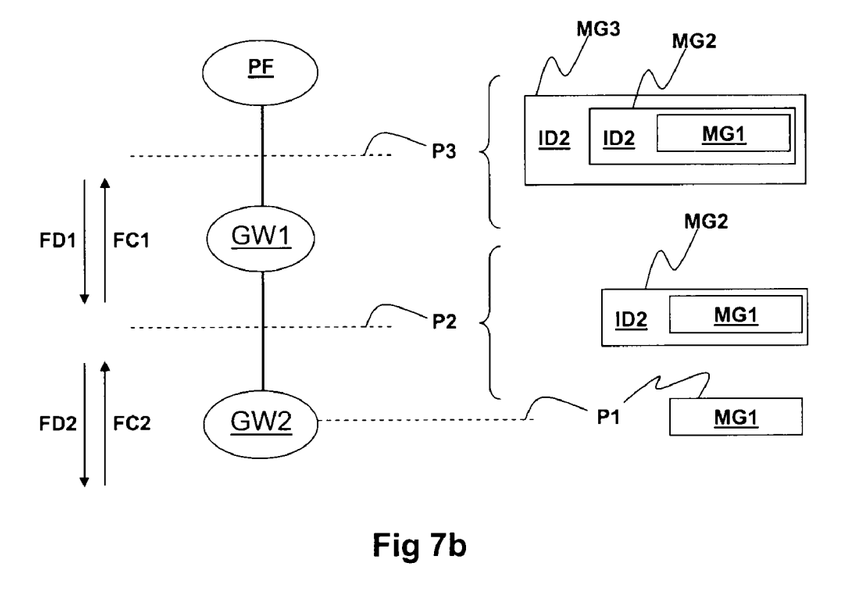
FIG. 7b schematically shows different states of a second example of a data packet during its transmission between a gateway machine and a platform.

The method according to the invention, as far as the packet reception part used concerned, is described in more detail in the specific case of the second example of data packets shown in FIG. 7b.

In this example, a data packet P is transmitted by the gateway GW2 itself to the platform PF. Here, the data packet P still has different contents P1, P2, P3 during its transmission from the gateway GW2 to the platform PF.

Following generation by the gateway GW2, the packet P has a content P1 and comprises, in particular, a message MG1 destined for the platform PF.

Following transmission by the gateway GW2 and on reception by the gateway GW1, the packet P has a content P2. The packet P2 comprises the message MG1 destined for the platform PF and optionally identification data of the machine transmitting the packet P inserted by the gateway GW2 before dispatch of the packet M2, i.e. identification data ID2 of gateway GW2 itself. Alternatively, it may be provided that the identification data inserted by the gateway when it is itself the transmitter of a packet are zero.

The packet P2 is encoded on the basis of the packet P1 by the gateway GW2 as if the packet P1 had been transmitted by one of the machines M4 or M5 of the sub-network managed by the gateway GW2, i.e. through application of the encoding function FC2 associated with the gateway GW2.

Following transmission by the gateway GW1 and on reception by the platform PF, the packet P has a content P3. The packet P3 comprises the message MG1 destined for the platform PF and identification data ID2 of the machine GW2 transmitting the packet P2, inserted by the gateway GW1 during the passage of the packet P. The packet P3 optionally comprises twice the identification data ID2 of the gateway GW2.

The processing of the packet P in this second example is identical to that of the first example given above, apart from the few differences described below.

The initial steps 500 to 510 of the communications method are carried out as in the case of the first packet example.

The first iteration of the method (steps 520 to 545) is carried out as in the case of the first packet example, whereby the platform PF obtains the packet P2 from the received packet P3.

The second iteration of the method (steps 520 to 545) is carried out as in the case of the first packet example, whereby the platform PF obtains the packet P1 from the packet P2, but with the exception of the step 545 during which the identification data $ID_{N+1}$ extracted in the preceding step 540 are compared with the identification data stored in the memory ID.

In the example described here, the identification data ID=ID2 of the machine GW2 are compared with the identification data $ID_{N+1}$=ID2 of the machine GW2. As the values are equal, the step 550 is therefore carried out following the step 545. There is therefore no additional decoding function to be searched for since the gateway GW2 generated the packet P. Moreover, there is no point in recording the identification data ID2 in association with the identification data ID2 in the management table TG. The method therefore ends following the step 550.

It will thus be understood how the test of the step 545 enables detection and processing of the cases where an interconnection gateway transmits a packet on its own account.

As far as the packet transmission part is concerned, the situation in which the platform PF transmits a data packet to the interconnection gateway GW2 entails no modification of the steps 600 to 660 of the method according to the invention as described in the case of the first packet example.

According to a preferred implementation, the different steps of the method according to the invention are implemented by software, said software comprising software instructions intended to be run by a data processor of the platform and designed to control the performance of the different steps of this method.

Consequently, the invention also envisages a program which can be run by a computer or by a data processor, said program comprising instructions to control the performance of the steps of a method as mentioned above.

This program can use any given programming language, and can be in the form of source code, object code, or intermediate code between source code and object code, such as in a partially compiled form, or in any other required form.

The invention also envisages an information medium which can be read by a computer or data processor, and which comprises instructions of a program as mentioned above.

The information medium may involve any entity or device capable of storing the program. For example, the medium may comprise a storage means, such as a ROM, for example a CD ROM or microelectronic circuit ROM, or a magnetic recording means, for example a diskette (floppy disk) or hard disk.

Moreover, the information medium may be a transmittable medium, such as an electrical or optical signal, which can be routed via an electrical or optical cable, by radio or by other means. The program according to the invention may, in particular, be downloaded from an Internet network.

Alternatively, the information medium may be an integrated circuit in which the program is incorporated, said circuit being adapted to run or to be used in the running of the method in question.

The invention can be applied to any network configuration, regardless of the number of secondary networks, regardless of the addressing technology of the machines used in these secondary networks and regardless of the type of encoding/decoding applied by the gateways during the passage of a packet. In particular, even if a gateway is transparent and does not apply any encoding/decoding function to a packet, except possibly the insertion of identification data, it is provided to store a non-zero pointer to a encoding/decoding function which does not modify the input data which it receives. In this way, the described method remains generic and applicable in all cases.

The invention provides a generic solution for machine-to-machine communications. It presupposes the implementation in the platform of encoding and decoding functions, each corresponding to a decoding or encoding function implemented by a management device of a secondary network via which the packets pass.

Given that the secondary network management devices GW1, GW2 are themselves seen and identified by the platform PF in the same way as a machine M0 to M5, such a device GW1, GW2 is capable of transmitting messages for its own account and of communicating with the platform PF according to the same method. The method is therefore completely generic.

What is claimed is:

1. A method for processing at least one data packet sent by a machine, transmitted through a second data transmission network to a first interconnection device between said second data transmission network and a first data transmission network and then through said first data transmission network to a receiving entity, the at least one data packet transmitted through a third data transmission network to a second interconnection device between said third data transmission network and said second data transmission network, said method comprising:

obtaining first identification data of said first interconnection device;

obtaining an identifier of a first decoding function associated with said first identification data from a decoding functions table storing a decoding function identifier in association with device identification data, said first decoding function being an inverse function of a first encoding function applied by said first interconnection device to the at least one data packet before transmission;

generating a second packet by applying said decoding function to the at least one data packet;

obtaining second identification data of said second interconnection device;

obtaining from said decoding functions table an identifier of a second decoding function associated with said second identification data, said second decoding function being an inverse function of a second encoding function applied by said second interconnection device to the at least one data packet encoded in accordance with the first encoding function before transmission; and generating a third packet by applying said second decoding function to the second packet.

2. The method as claimed in claim 1, comprising, by a second interconnection device, a storage step to store, in a table recording in association with identification data of a first machine identification data of a second machine via which a secondary network to which the first machine belongs is accessible, identification data of the second interconnection device in association with identification data of the first interconnection device.

3. The method as claimed in claim 1, wherein said first identification data are extracted from said at least one data packet.

4. A method for processing at least one data packet to be transmitted by a transmitting entity to a machine via a first data transmission network and a second data transmission network through a first interconnection device between said first data transmission network and said second data transmission network, the at least one data packet transmitted via a third data transmission network through a second interconnection device between said second data transmission network and said third data transmission network, said method comprising:

obtaining first identification data of said first interconnection device;

obtaining an identifier of a first encoding function associated with said first identification data from an encoding functions table storing an encoding function identifier in association with device identification data, said first encoding function being an inverse function of a first decoding function applied by said first interconnection device to the at least one data packet before transmission;

generating a second packet by applying said first encoding function;

obtaining second identification data of said second interconnection device;

obtaining from said encoding functions table an identifier of a second encoding function associated with said second identification data, said second encoding function being an inverse function of a second decoding function applied by said second interconnection device to the at least one data packet decoded in accordance with the first decoding function before transmission; and generating a third packet by applying said second encoding function to said second packet.

5. The method as claimed in claim 4, wherein said first identification data of said first interconnection device are obtained from identification data of said machine by reading in a table recording in association with identification data of a first machine identification data of a second machine via which a secondary network to which the first machine belongs is accessible.

6. The method as claimed in claim 4, comprising, by a second interconnection device, obtaining identification data of said first interconnection device from data stored in a table recording in association with identification data of a first machine identification data of a second machine via which a secondary network to which the first machine belongs is accessible.

7. A communications device suitable for receiving at least one data packet sent by a machine, transmitted through a second data transmission network to a first interconnection device between said second data transmission network and a first data transmission network and then through said first data transmission network to said communication device, the at least one data packet transmitted through a third data transmission network to a second interconnection device between said third data transmission network and said second data transmission network, said communication device comprising:

means for obtaining first identification data of said first interconnection device;

means for obtaining an identifier of a first decoding function associated with said identification data from a decoding functions table storing a decoding function identifier in association with device identification data, said first decoding function being an inverse function of a first encoding function applied by said first interconnection device to the at least one data packet before transmission;

means for generating a second packet by applying said decoding function to the at least one data packet;

means for obtaining second identification data of said second interconnection device;

means for obtaining from said decoding functions table an identifier of a second decoding function associated with said second identification data, said second decoding function being an inverse function of a second encoding function applied by said second interconnection device to the at least one data packet encoded in accordance with the first encoding function before transmission; and     means for generating a third packet by applying said second decoding function to the second packet.

8. A communications device suitable for transmitting at least one data packet to a machine via a first data transmission network and a second data transmission network through a first interconnection device between said first data transmission network and said second data transmission network, the at least one data packet transmitted via a third data transmission network through a second interconnection device between said second data transmission network and said third data transmission network, said communications device comprising:

means for obtaining first identification data of said first interconnection device;

means for obtaining an identifier of a first encoding function associated with said first identification data from an encoding functions table storing an encoding function identifier in association with device identification data, said first encoding function being an inverse function of a first decoding function applied by said first interconnection device to the at least one data packet before transmission; and     means for generating a second packet by applying said first encoding function;

means for obtaining second identification data of said second interconnection device;

means for obtaining from said encoding functions table an identifier of a second encoding function associated with said second identification data, said second encoding function being an inverse function of a second decoding function applied by said second interconnection device to the at least one data packet decoded in accordance with the first decoding function before transmission; and     means for generating a third packet by applying said second encoding function to said second packet.

\* \* \* \* \*